US010465453B2

(12) United States Patent
Lepreux

(10) Patent No.: US 10,465,453 B2
(45) Date of Patent: Nov. 5, 2019

(54) MOVEMENT COMPENSATION SYSTEM FOR A LOAD ATTACHED TO A MOVABLE FACILITY COMPRISING HYBRID DAMPING MEANS

(71) Applicant: IFP Energies nouvelles, Rueil-Malmaison (FR)

(72) Inventor: Olivier Lepreux, Lyons (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 15/770,005

(22) PCT Filed: Oct. 20, 2016

(86) PCT No.: PCT/EP2016/075193
§ 371 (c)(1),
(2) Date: Apr. 20, 2018

(87) PCT Pub. No.: WO2017/080776
PCT Pub. Date: May 18, 2017

(65) Prior Publication Data
US 2018/0313174 A1 Nov. 1, 2018

(30) Foreign Application Priority Data
Nov. 12, 2015 (FR) ..................................... 15 60836

(51) Int. Cl.
*E21B 19/09* (2006.01)
*B66C 13/02* (2006.01)
(Continued)

(52) U.S. Cl.
CPC .............. *E21B 19/09* (2013.01); *B66C 13/02* (2013.01); *B66C 13/04* (2013.01); *E21B 19/006* (2013.01); *F16F 9/06* (2013.01)

(58) Field of Classification Search
CPC ....... B66C 13/02; B66C 13/04; E21B 19/006; E21B 19/09; F16F 9/06
See application file for complete search history.

(56) References Cited

U.S. PATENT DOCUMENTS 3,285,574 A * 11/1966 Berne ..................... E21B 7/128
 175/5
4,620,692 A * 11/1986 Foreman ................. B66C 13/02
 254/277

(Continued)

FOREIGN PATENT DOCUMENTS

| CN | 101654145 A | 2/2010 |
|---|---|---|
| FR | 2575452 A1 | 7/1986 |

(Continued)

OTHER PUBLICATIONS

International Search Report for PCT/EP2016/075193, dated Jan. 19, 2017; English translation submitted herewith (5 pgs.).

*Primary Examiner* — James G Sayre
(74) *Attorney, Agent, or Firm* — Fitch, Even, Tabin & Flannery, LLP

(57) ABSTRACT

The present invention relates to a motion (heave) compensation system for a load hanging from a mobile unit (1), the system comprising two blocks (3, 4) and hybrid damping means. According to the invention, the damping means comprise an oleopneumatic damping system (6) and an electric drive system (9, 10). The invention further relates to the use of such a compensation system for heave compensation for drilling tools support.

17 Claims, 4 Drawing Sheets

(51) Int. Cl.
*E21B 19/00* (2006.01)
*B66C 13/04* (2006.01)
*F16F 9/06* (2006.01)

(56) References Cited

U.S. PATENT DOCUMENTS

| | | | | |
|---|---|---|---|---|
| 5,520,369 A | * | 5/1996 | Chatard | B66C 13/02 |
| | | | | 254/277 |
| 6,595,494 B1 | * | 7/2003 | Roodenburg | B66C 13/02 |
| | | | | 254/277 |
| 9,784,051 B2 | * | 10/2017 | Bergan | B63B 39/00 |
| 2018/0216421 A1 | * | 8/2018 | Nunes | E21B 15/02 |
| 2018/0266195 A1 | * | 9/2018 | Odru | F16H 23/00 |

FOREIGN PATENT DOCUMENTS

| | | | | |
|---|---|---|---|---|
| KR | 20120035432 A | | 4/2012 | |
| WO | WO-2016087171 A1 | * | 6/2016 | F16H 23/00 |

* cited by examiner

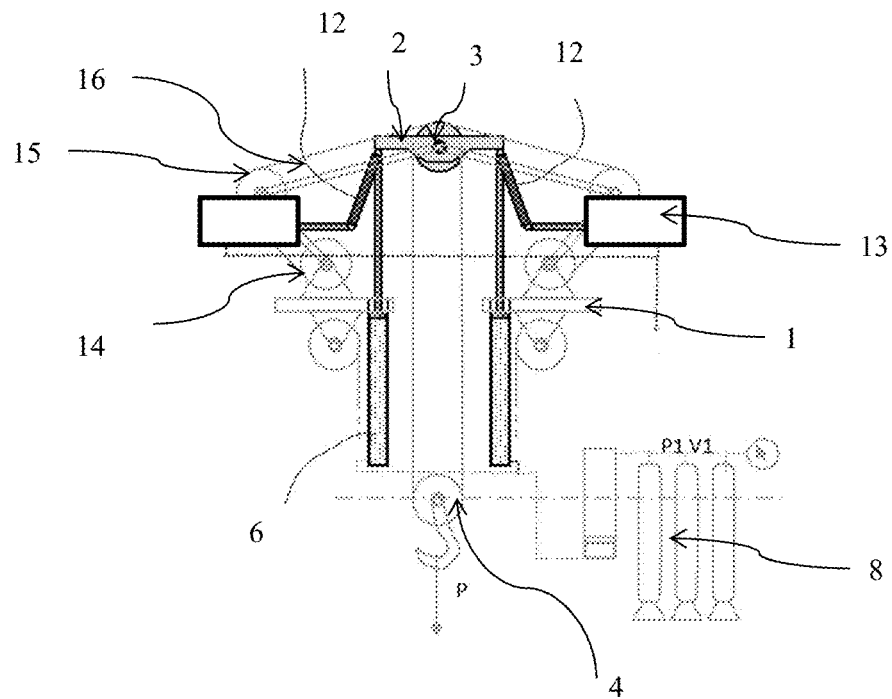
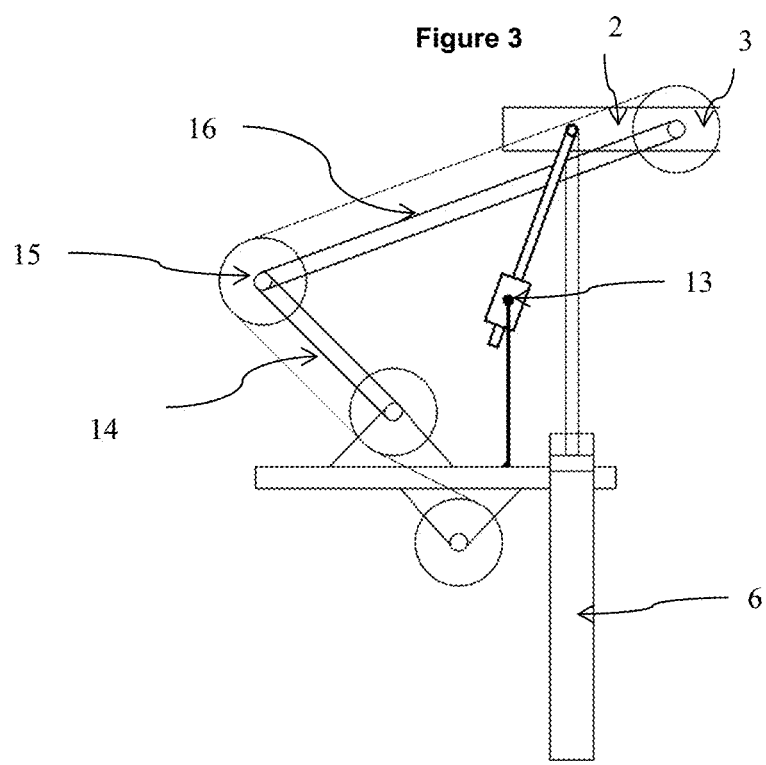
Figure 4

MOVEMENT COMPENSATION SYSTEM FOR A LOAD ATTACHED TO A MOVABLE FACILITY COMPRISING HYBRID DAMPING MEANS

CROSS-REFERENCE TO RELATED APPLICATIONS

This application is a U.S. national phase application filed under 35 U.S.C. § 371 of International Application No. PCT/EP2016/075193, filed Oct. 20, 2016, designating the United States, which claims priority from French Patent Application No. 15/60.836, filed Nov. 12, 2015, which are hereby incorporated herein by reference in their entirety.

FIELD OF THE INVENTION

The present invention relates to the field of motion compensation for a mobile element hanging from a mobile unit. More particularly, the invention relates to the compensation of the heave motion of an offshore unit for an offshore drill bit, a riser pipe or an offshore blowout preventer setting tool.

BACKGROUND OF THE INVENTION

Indeed, at sea, the wave motion causes, among other things, heave, i.e. an oscillating motion of vertical translation of the flooring units. When the latter support tools such as drill bits, the heave needs to be compensated for so that the tool is permanently in contact with the hole bottom.

To compensate for such motions, there are three major families of devices:
  devices that are set in the drill string,
  devices that are interposed between the string and the drill rig lifting system, and
  devices that are integrated in the lifting system.

The device type of the third family conventionally solves the heave compensation problem by making a first block, referred to as crown block, mobile, and if also comprises a second block, referred to as travelling block. The second block is called travelling block because if is mobile relative to the mobile unit. However, through the agency of the heave compensator, the second block is made substantially stationary in relation to the sea bottom. It is reminded that a block is a mechanical device allowing a load to be lifted by several cable strands.

Furthermore, this type of device generally comprises at least one cylinder connected to accumulators, notably pneumatic accumulators. These accumulators occupy a large volume, which is penalizing, in particular for an offshore application.

Documents KR-2,012,035,432 and CN-101,654,145 describe examples of compensation systems.

An important quantity for such a device is the variation of the force exerted on the first block (crown block) according to the motion of the mobile unit in relation to a constant value the device should support without heave. The difference between the real force and this constant value is referred to as error.

Furthermore, document FR-2,575,452 (U.S. Pat. No. 5,520,369) describes such a system comprising two blocks, at least one compensation cylinder connected to accumulators, a cable and two articulated arms including sheaves and rods that allow to compensate for a motion for an element hanging from a mobile unit. This system allows to reduce the volume of the accumulators through a suitable geometry of the articulated arms and to partly reduce the error. However, for this design, the volume of the accumulators remains large (approximately 16 m$^3$ for a conventional design), and compensation errors remain significant; the force on the load is hardly constant.

The present invention relates to a motion (heave) compensation system for a load hanging from a mobile unit, the system comprising two blocks and hybrid damping means. According to the invention, the damping means comprise an oleopneumatic damping system and an electric drive system. The combined use of an electric drive system and of an oleopneumatic damping system allows to reduce or even to cancel the compensation error while decreasing the accumulation volume required for the oleopneumatic damping system. Furthermore, unlike entirely passive approaches, the damping means of the system according to the invention allow to compensate for certain nonlinearities, and therefore to reach better performances.

SUMMARY OF THE INVENTION

The invention relates to a motion compensation system for a load hanging from a mobile unit, comprising a first block and a second block designed for hanging said load, said first block being connected to said mobile unit by damping means configured to damp a motion of said mobile unit, said motion compensation system comprising a cable running over said first and second blocks. Said damping means comprise at least one oleopneumatic damping system and at least one electric drive system.

According to the invention, said oleopneumatic damping system comprises at least one hydraulic cylinder and at least one accumulator in oleopneumatic connection with said hydraulic cylinder.

According to an implementation of the invention, said oleopneumatic damping system has a first end connected to the mobile unit and a second end connected to said first block.

According to a variant, said electric drive system is arranged in series with said oleopneumatic damping system.

Advantageously, said electric drive system drives a rod of said oleopneumatic damping system.

According to an alternative embodiment, said electric drive system is arranged in parallel with said oleopneumatic damping system.

Preferably, said electric drive system has a first end connected to said mobile unit and a second end connected to said first block.

Alternatively, said electric drive system is arranged in such a way that at least at one point of the stroke of said oleopneumatic damping system, said electric drive system exerts an action in a substantially orthogonal direction to the direction of displacement of said first block.

Preferably, at least two electric drive systems are arranged symmetrically relative to the axis of said oleopneumatic damping system, so that the components of their actions orthogonal to the direction of the first block cancel each other out for any position of the first block.

Advantageously, one end of said electric drive system is connected to said first block through the agency of an articulated system.

According to a design of the invention, said electric drive system comprises a mobile rod connected to a reversible linear actuator, said linear actuator being driven by an electric motor.

According to a characteristic, said electric drive system comprises an electrical energy storage system connected to said electric motor.

According to an implementation of the invention, said first block is connected to the mobile unit by at least two articulated arms, each articulated arm comprising at least one sheave, said heave compensator comprising a cable running over said sheaves of said articulated arms and over said first and second blocks.

According to a variant embodiment, one end of said electric drive system is directly connected to said sheave of said articulated arm.

In a variant, one end of said electric drive system is connected to said sheave of said articulated arm by means of an articulated system.

According to an embodiment of the invention, said damping means comprise two oleopneumatic damping systems and two electric drive systems.

Furthermore, the invention relates to a use of a motion compensation system according to one of the above characteristics, for heave compensation for offshore drill bit support and/or load laying.

BRIEF DESCRIPTION OF THE FIGURES

Other features and advantages of the system according to the invention will be clear from reading the description hereafter of embodiments given by way of non limitative example, with reference to the accompanying figures wherein:

FIG. 3 illustrates a heave compensator according to a third embodiment of the invention, FIGS. 4 to 6 illustrate a heave compensator according to three variants of the third embodiment of the invention.

DETAILED DESCRIPTION OF THE INVENTION

Figure 1:
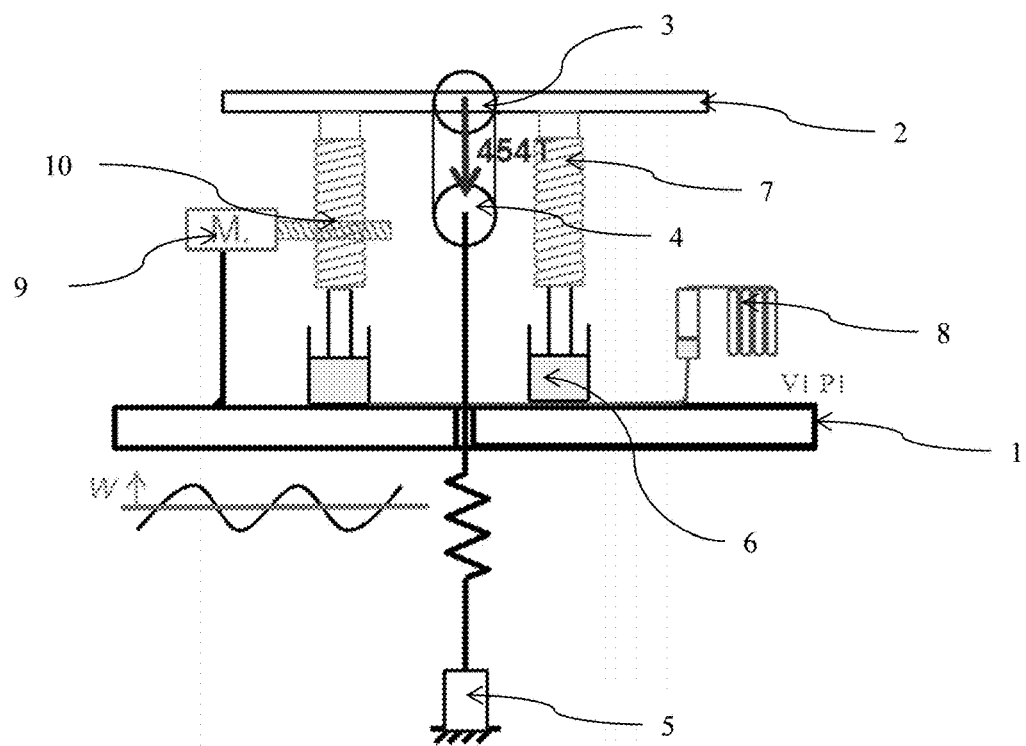
FIG. 1 illustrates a heave compensator according to a first embodiment of the invention.

The present invention relates to a motion compensation system (heave compensator) for an element (also referred to as load) attached to (or hanging from) a mobile unit. The compensation system comprises:
- a first block, referred to as crown block, equipped with at least one sheave,
- a second block, referred to as travelling block, from which the element is hanging, the second block being equipped with at least one sheave; preferably, the first and second blocks are vertically aligned,
- a cable connected to the mobile unit and running-over the two blocks, the cable forming at least one loop around the first and second blocks, and the cable can be fixed to the mobile unit by retaining means; the means retaining the cable on the mobile unit can comprise at least one winch allowing the cable length to be adjusted, and
- damping means, one end of which is connected to the first block and the other end is connected to the mobile unit.

The motion of the mobile unit (heave for example) is largely compensated for by the movement of the first block with respect to the mobile unit. Thus, the second block is stationary with respect to a fixed reference-point (the sea bottom for example). The movement of the first block is controlled by the damping means.

The first block can be mounted on a supporting element (a frame for example) and the damping means can be arranged between the mobile unit and the frame.

According to a design of the heave compensator, it can further comprise:
- an articulated system comprising at least two articulated arms, preferably two or four arms arranged symmetrically, the articulated system connecting the mobile unit to the first block, each articulated arm comprising at least one sheave,
- the cable runs over the sheaves of the articulated arms and of the first and second blocks, the cable forming at least one loop around the first and second blocks.

The articulated arms allow the length of the cable to be kept constant upon motion of the first block relative to the mobile unit.

According to an aspect of the invention, each articulated arm of the heave compensator can comprise a plurality of connecting rods articulated with one another and at least one sheave arranged at each joint between two rods.

Preferably, each articulated arm can comprise two connecting rods and a sheave. A first end of a first rod can then be articulated on the mobile unit. Moreover, a second end of a first rod can be articulated relative to a first end of the second rod. Furthermore, a second end of the second rod can be articulated relative to the first block. Besides, a sheave can be provided at the joint between the two rods.

According to the invention, the damping means comprise an oleopneumatic damping system and an electric drive system. These damping means can be called hybrid since they use two distinct energies (electrical and oleopneumatic). The combined action of the oleopneumatic and electric damping means allows the motion of the mobile unit (heave) to be compensated for. The principle of this hybrid architecture is to exert an additional force on the first block by means of the electric drive system. The electric drive system is referred to as active, i.e. it can be controlled, whereas the oleopneumatic damping system can be a so-called passive system, i.e. operating without any particular control. Furthermore, the presence of an electric drive system allows to reduce the size of the oleopneumatic damping system (if necessary by reducing the volume of the accumulators of the oleopneumatic damping system) in relation to damping means comprising only an oleopneumatic damping system. Indeed, the electric drive system allows to take up part of the stresses and enables less significant sizing of the oleopneumatic damping system. Besides, the electric drive system allows to reduce or even to cancel the compensation error due to the oleopneumatic damping system. Indeed, using an electric drive system, unlike passive systems, allows to compensate for certain nonlinearilties (friction in the sheaves and the cylinders for example). Besides, this hybridization allows to reduce the size of the electric drive system components in relation to a solution that would be based only on electric damping means.

Preferably, the electric motor can be controlled in such a way that the supplementary force added by the electric drive system to the force exerted by the oleopneumatic damping system perfectly compensates for the weight of the suspended load.

Advantageously, the damping means can comprise two oleopneumatic damping systems and two electric drive systems so as to reduce the stresses on each system and thus to enable the size of the system allowing motion compensation to be reduced. These damping means can toe arranged symmetrically on either side of the blocks.

Preferably, a first end of the oleopneumatic damping system can be fixed to the mobile unit and the second end can be directly connected to the first block.

According to a first characteristic, the oleopneumatic damping system can comprise at least one hydraulic cylinder and at least one accumulator in oleopneumatic connection with the hydraulic cylinder. The term accumulator designates a reserve of compressed gas, air for example, in connection with an intermediate cylinder of oleopneumatic type that separates the gas of the reserve gas from the oil of the hydraulic cylinder. The compressed gas reserve can come in form of gas bottles. The embodiment at this oleopneumatic damping system can be identical to that described in document FR-2,575,452 (U.S. Pat. No. 5,520,369) with a reduced-size oleopneumatic accumulator. When at least two oleopneumatic damping systems are used, it is possible to share the accumulator to balance the pressures and therefore the forces in the hydraulic cylinders.

According to a second characteristic, the electric drive system can comprise at least one electric motor that drives in translation a mobile rod by means of a reversible linear actuator, of screw-and-nut type for example. For the linear actuator, the nut is fixed whereas the screw is mobile. Other linear actuators may be considered, notably of rack and pinion type or similar.

The electric drive system can further comprise electrical energy storage means, for example a battery, a supercapacitor or a flywheel. The electrical energy storage means allow the electric motor to be supplied so as to actuate the motion of the mobile rod. Furthermore, the electrical energy storage means enable storage of the electrical energy produced by the electric motor when a force is applied onto the mobile rod, and therefore the linear actuator.

According to an aspect of the invention, the electric motor/generator can be of universal, synchronous, alternating-current or direct-current asynchronous type. The electric motor(s) can be brushless motor(s). For example, the electric motor can be an alternating-current asynchronous motor of squirrel cage alternator type. This type of motor/generator is generally very robust and efficient. Furthermore, this type of asynchronous motor is suited for operation as a generator; indeed, this type of motor is currently used notably for wind turbines and in hybrid vehicles.

According to another aspect of the invention, the screw-and-nut type linear actuator can be a ball screw or roller screw type actuator. In this case, the linear actuator comprises a plurality of rolling elements, i.e. screws or rollers that are driven by the electric motor(s) and that drive a threaded part of the screw and vice versa. The threaded part of the screw is conditioned so as to make the linear actuator reversible; for example, the thread pitches of the actuator can have a triangular, trapezoidal or ovoid type thread, with a helix angle greater than the coefficient of friction. Furthermore, the metal of the screw can be selected with the lowest possible coefficient of friction by means of a suitable surface treatment. A continuous lubrication and protective system can also be provided to that end.

According to a first embodiment of the invention (compatible with the various aspects presented above, the electric drive system is arranged in series with the oleopneumatic damping system. Thus, the forces of the two damping systems add up. This first embodiment allows to use a single rod for the electric drive system and for the oleopneumatic damping system.

According to a variant of this first embodiment, the electric drive system drives a rod of the oleopneumatic damping system, the oleopneumatic damping system has a first end fixed to the mobile unit and a second end fixed to the first block, in cases where the electric drive system comprises an electric motor and a screw-and-nut type actuator, the screw of the screw-and-nut system can correspond to the rod of the oleopneumatic damping system, for example the rod of a hydraulic cylinder.

FIG. 1 illustrates this variant of the first embodiment by way of non limitative example. In this figure, the articulated arms and the cable are not shown. A load 5 hangs from a second block 4, connected by a cable to a first block 3. Load 5 remains in contact with the sea bed. First block 3 is mounted on a frame 2 that is connected to mobile unit 1 by damping means. The wave motion is schematically shown below mobile unit 1. The force exerted by the load on first block 3 is schematically illustrated by an arrow and by a load value example of 454 tons (T). The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which first block 3 is fixed corresponds to rod 7 of hydraulic cylinder 6. The two hydraulic cylinders are in oleopneumatic connection with an accumulators 8, of volume V1 and pressure P1. The damping means further comprise two electric drive systems (only one is shown in FIG. 1 for ease of reference) distributed symmetrically on either side of the load. Each electric drive system comprises an electric motor 9 and a screw-and-nut linear actuator 10. Linear actuator 10 causes translation of rod 7 of hydraulic cylinder 6. A driving torque can be exerted in one direction or the other, and thus create a vertical force on rod 7. Electric motor 9 is fixed to mobile unit 1. In this figure, the electrical energy storage means and the power electronics means are not shown.

According to a second embodiment of the invention (compatible with the various aspects presented above), the electric drive system is arranged parallel to the oleopneumatic damping system. This architecture allows an independent design of the two drive means to be achieved. This embodiment allows to avoid any specific damping system design.

According to a variant of this second embodiment, the electric drive system has a first end fixed to the mobile unit and a second end fixed to the first block. Similarly, the oleopneumatic damping system has a first end fixed to the mobile unit and a second end fixed to the first block.

Figure 2:
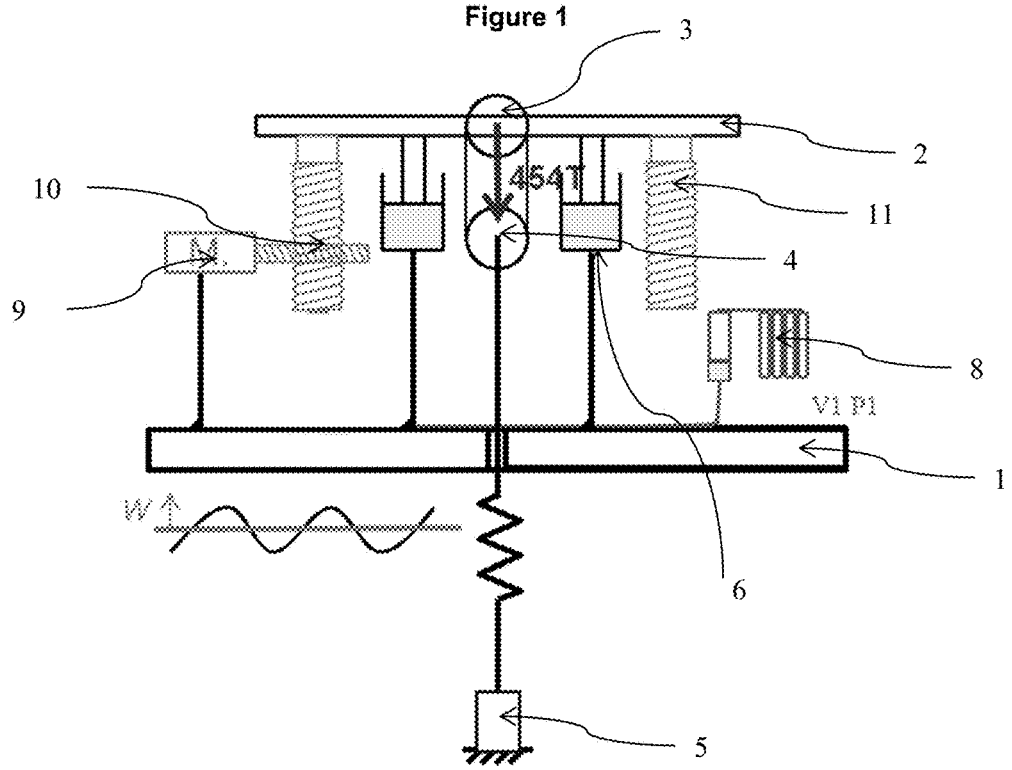
FIG. 2 illustrates a heave compensator according to a second embodiment of the invention.

FIG. 2 illustrates this variant of the second embodiment by way of non limitative example. In this figure, the articulated arms and the cable are not shown. A load 5 hangs from a second block 4, connected by a cable to a first block 3. Load 5 remains in contact with the sea bed. First block 3 is mounted on a frame 2 that is connected to mobile unit 1 by damping means. The wave motion is schematically shown below mobile unit 1. The force exerted by the load on first block 3 is schematically illustrated by an arrow and by a load value example of 454 tons (T). The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which first block 3 is fixed corresponds to the rod of hydraulic cylinder 6. The two hydraulic cylinders are in oleopneumatic connection with an accumulator 8, of volume V1 and pressure P1. The damping means further comprise two electric drive systems (only one is shown in FIG. 2 for ease of reference) distributed symmetrically on either side of the load. Each electric drive system comprises an electric motor 9 and a screw-and-nut linear actuator 10. Linear actuator 10 causes translation of a mobile rod 11 fixed to frame 2, on which first block is mounted. A driving torque can be exerted in one direction or the other, and thus create a vertical force, on rod 11. Electric motor 9 is fixed to mobile unit 1. In this figure, the electrical energy storage means and the power electronics means are not shown.

According to a third embodiment of the invention (compatible with the various aspects presented above), the electric drive system is arranged in such away that, at one point of the stroke of the oleopneumatic damping system, the electric drive system exerts an action in a substantially orthogonal direction to the direction of displacement of the first block.

According to a variant of this third embodiment, at least two electric drive systems are arranged symmetrically relative to the axis of the oleopneumatic damping system, so that the horizontal components (or orthogonal to the direction of the first block) of their actions cancel each other out for any position of the first block.

According to another variant of this third embodiment (compatible with the variant described above), one end of the electric drive system is connected to the first block by means of an articulated system. The articulated system can comprise at least one connecting rod. Preferably, the articulated system comprises two connecting rods. One end of the rods is fixed to the electric drive system and another end is fixed to the frame on which the first block is mounted.

FIG. 3 illustrates an example of the third embodiment with the two variants described above, by way of non limitative example. A load hangs from a second block 4, connected by a cable to a first block 3. First block 3 is mounted on a frame 2 that is connected to mobile unit 1 by damping means and two articulated arms 16. Each articulated arm comprises two connecting rods 14 and 16, and a sheave 15. One end of rod 14 is articulated on mobile unit 1. The second end of rod 14 is articulated on a first end of connecting rod 16. The second end of rod 16 is articulated relative to frame 2. Sheave 15 is arranged at the joint of connecting rods 14 and 16. A cable runs over sheave 15 of a first articulated arm, over the two blocks 3 and 4 (by forming one or several strands) and over sheave 15 of a second articulated arm. The cable can be fixed on one side Jo the mobile unit and on the other if can be mounted on a winch. The force exerted by the load on first block 3 is schematically illustrated by an arrow P. The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which the block is fixed corresponds to the rod of hydraulic cylinder 6. The two hydraulic cylinders are in oleopneumatic connection with an accumulator 8, of volume V1 and pressure P1. The damping means further comprise two electric drive systems 13 (schematically shown, without details of the screw-and-nut system) distributed symmetrically on either side of the load. Each electric drive system drives in translation a rod that is articulated relative to one end of a connecting rod 12. The other end of rod 12 is articulated relative to frame 2, on which first block 3 is mounted. For this embodiment example, the electric drive systems are orthogonal to the oleopneumatic damping systems. In this figure, the electrical energy storage means and the power electronics means are not shown.

Other configurations of this third embodiment can be achieved:

According to a first design of this third embodiment, the rod of the oleopneumatic damping system is directly connected to the first block and the electric drive system is articulated, on the one hand, relative to the mobile unit and, on the other hand, relative to the frame. For this variant embodiment, the electric drive system can be inclined with respect to the direction of displacement of the oleopneumatic damping system. This design affords the advantage of significantly reducing the length of the rod in relation to the second embodiment.

FIG. 4 illustrates an example of the third embodiment according to this first design in a non limitative manner. This figure shows only one side of the compensation system and the second side can be deduced by symmetry. A load hangs from a second block (not shown), connected by a cable to a first block 3. First block 3 is mounted on a frame 2 that is connected to mobile unit 1 by damping means and two articulated arms. Each articulated arm comprises two connecting rods 14 and 16, and a sheave 15. One end of rod 14 is articulated on mobile unit 1. The second end of rod 14 is articulated on a first end of connecting rod 16. The second end of rod 16 is articulated relative to frame 2. Sheave 15 is arranged at the joint of rods 14 and 16. A cable runs over sheave 15 of a first articulated arm, over the two blocks 3 (by forming one or several strands) and over sheave 15 of a second articulated arm. The cable can be fixed on one side to the mobile unit and on the other it can be mounted on a winch. The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which the block is fixed corresponds to the rod of hydraulic cylinder 6. The two hydraulic cylinders are in oleopneumatic connection with an accumulator (not shown). The damping means further comprise two electric drive systems 13 distributed symmetrically on either side of the load. The electric drive means are of screw-and-nut type. Each electric drive system drives in translation a rod that is articulated relative to one end of frame 2, on which first block 3 is mounted. For this embodiment example, the electric drive systems are inclined with respect to the oleopneumatic damping systems and, at one point of the stroke of the oleopneumatic damping system, the electric drive system is substantially orthogonal to the oleopneumatic damping system. In this figure, the electrical energy storage means and the power electronics means are not shown.

According to a second design of this third embodiment, the rod of the oleopneumatic damping system is connected to the first block and the electric drive system is articulated relative to the articulated arms, preferably at a sheave, but this articulated connection can be achieved at any point of the articulated system. This design allows the stroke of the rod to be reduced.

Figure 5:
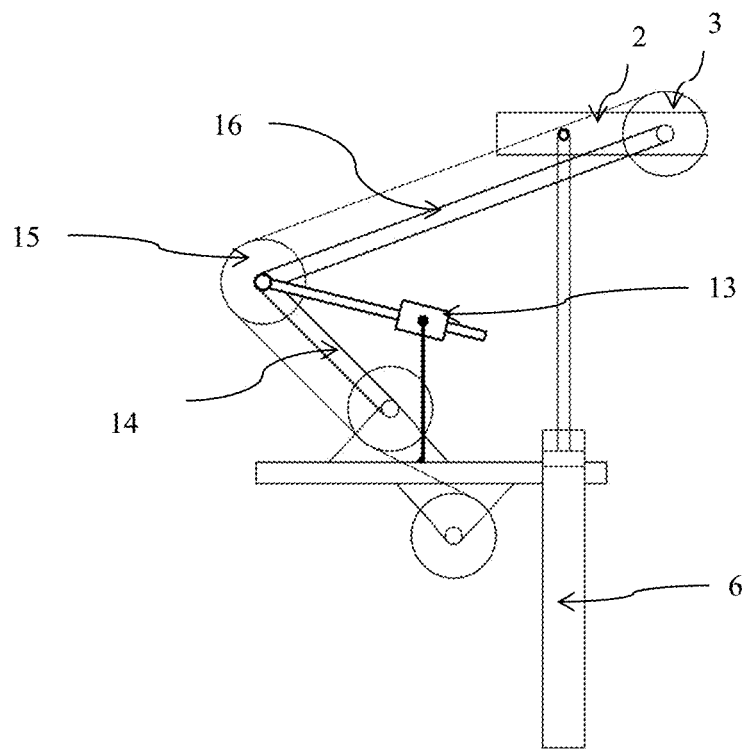

FIG. 5 illustrates an example of the third embodiment according to this second design in a non limitative manner. This figure shows only one side of the compensation system and the second side can be deduced by symmetry. A load hangs from a second block (not shown), connected by a cable to a first block 3. First block 3 is mounted on a frame 2 that is connected to mobile unit 1 by damping means and two articulated arms. Each articulated arm comprises two connecting rods 14 and 16, and a sheave 15. One end of rod 14 is articulated on mobile unit 1. The second end of rod 14 is articulated on a first end of connecting rod 16. The second end of rod 16 is articulated relative to frame 2. Sheave 15 is arranged at the joint of rods 14 and 16. A cable runs over sheave 15 of a first articulated arm, over the two blocks 3; (by forming one or several strands) and over sheave 15 of a second articulated arm. The cable can be fixed on one side to the mobile unit and on the other it can be mounted an a winch. The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which the block is fixed corresponds to the rod of hydraulic cylinder 6. The two hydraulic cylinders are in oleopneumatic connection with an accumulator (not shown). The damping means further comprise two electric drive systems 13 distributed symmetrically on either side of the load. The electric drive means are of screw-and-nut type. Each electric drive system drives in translation a rod that is articulated relative to one end of sheave 15. For this, embodiment example, the electric drive systems are inclined with respect to the oleopneumatic damping systems and, at one point of the stroke of the oleopneumatic damping system, the electric drive system is substantially orthogonal to the oleopneumatic damping system. In this figure, the electrical energy storage means and the power electronics means are not shown.

According to a third design of the third embodiment, the rod of the oleopneumatic damping system is connected to the first block and the electric drive system is connected to the articulated arms, by means of a connecting rod, preferably at a sheave, but this articulated connection between the connecting rod and the articulated, arm can be achieved at any point of the articulated system. This design allows to reduce the stroke of the rod and to make the electric drive system stationary.

Figure 6:
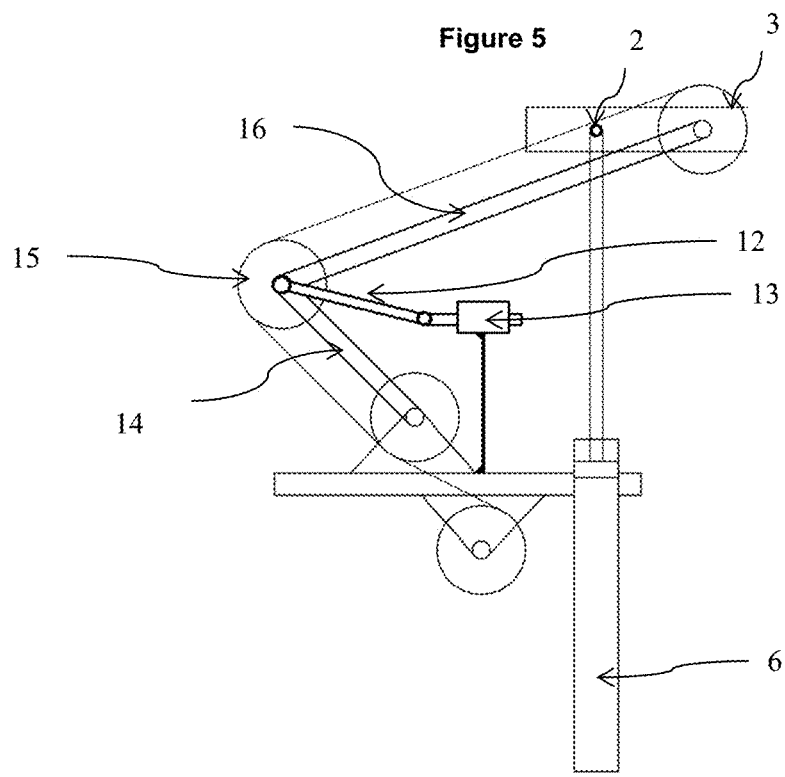

FIG. 6 illustrates an example of the third embodiment according to this third design in a non limitative manner. This figure shows only one side of the compensation system and the second side can be deduced toy symmetry. A load hangs from a second block (not shown), connected by a cable to a first block 3. First block 3 is mounted on a frame 2 that is connected to mobile unit 1 by damping means and two articulated arms. Each articulated arm comprises two connecting rods 14 and 16, and a sheave 15. One end of rod 14 is articulated on mobile unit 1. The second end of rod 14 is articulated on a first end of connecting rod 16. The second end of rod 16 is articulated relative to frame 2. Sheave 15 is arranged at the joint of rods 14 and 16. A cable runs over sheave 15 of a first articulated arm, over the two blocks 3 (by forming one or several strands) and over sheave 15 of a second articulated arm. The cable can be fixed on one side to the mobile unit and on the other it can be mounted an a winch. The damping means comprise two oleopneumatic damping systems symmetrically distributed on either side of the load. The oleopneumatic damping systems respectively comprise a hydraulic cylinder 6 whose one end is fixed to mobile unit 1 and whose other end is fixed to frame 2, on which first block 3 is mounted. The end on which the block is fixed corresponds to the rod of hydraulic cylinder 6. The two hydraulic cylinders are in oleopneumatic connection with an accumulator (not shown). The damping means further comprise two electric drive systems 13 distributed symmetrically on either side of the load. The electric drive means are of screw-and-nut type. Each electric drive system drives in translation a rod that is articulated relative to a connecting rod 12 whose other end is articulated relative to sheave 15. For this embodiment example, the electric drive systems are substantially orthogonal to the oleopneumatic damping systems. In this figure, the electrical energy storage means and the power electronics means are not shown.

The compensation system according to the invention can be used notably for compensation of the heave undergone by an offshore unit (vessel platform, etc.) during offshore drilling operations, when setting a riser pipe, for an offshore blowout preventer setting tool or for workover operations to restart drilling. In this case, the mobile unit is a floating unit, notably a vessel, and the suspended element is a drill bit or a riser, or an underwater pipe laying tool.

COMPARATIVE EXAMPLE

In this part, we provide damping means sizing elements. This example is based on the illustrated variant of the second embodiment of the invention (FIG. 2), the electric drive system further comprising electrical energy storage means in form of a supercapacitor. The sizing concerns the power of the electric motor and the energy stored in the supercapacitor. In order to compare the results with a totally electrical solution.

The power of the electric motor $P_{mot}$ can be written as:

$$P_{mot} = C_{mot} \omega_{mot}$$

with $C_{mot}$ the motor torque and $\omega_{mot}$ the rotating speed of the motor, and torque $C_{mot}$ can be written as follows:

$$C_{mot} = K F_{mot}$$

where K is the pitch of the screw-and-nut system and $F_{mot}$ is the force exerted on the rod by the electric motor via the screw-and-nut system.

The balance of the forces exerted at the frame gives:

$$F_{mot} + F_h = \frac{F_{HL}}{N}$$

where $F_{HL}$ is the force corresponding to the suspended weight (454 T according to the example), N the number of hydraulic cylinders (N=2) and $F_h$ the force exerted by a hydraulic cylinder.

Thus, the force exerted by an electric motor can be written as follows:

$$F_{mot}(t) = \frac{F_{HL}(t)}{N} - F_h(t)$$

Now, the force exerted by a hydraulic cylinder can be written:

$$F_h(t) = Sp(t)$$

where S is the section of a hydraulic cylinder and p the pressure in the accumulator. We have:

$$p(t) = \frac{p_1 V_1^{\gamma}}{V(t)^{\gamma}}$$

where $p_1$ is the initial pressure and $V_1^{\gamma}$ the initial total volume, and V is the volume at the time t depending on the stroke of the cylinder (therefore on the heave). V is written as follows:

$$V(t) = V_1 + c(t) \times S \times N$$

with c the stroke of a cylinder at the time t which can be written:

$$c(t) = c_0 - w(t)$$

where w is the heave height at the time t.

The hydraulic cylinders exert a force whose value depends on the pressure in the accumulator, therefore on the heave. Without an electric drive device, the compensation error is zero when the force exerted by the hydraulic cylinders exactly opposes the desired suspended weight. This occurs for a particular position of the rod of the hydraulic cylinders and therefore a particular heave value. For the other heave values, the error becomes alternately positive and negative depending on the position of the hydraulic cylinders rod in relation to this particular position. With a regular wave motion for example, the error changes sign at each wave period. The electric motors are then used to create a force allowing this error to be compensated for. The torques of the electric motors therefore change sign once per heave period. By way of comparison, in an entirely electric architecture, the motor torque is always positive.

The energy transferred to the electric motor (ideally by the storage system) can be written as follows:

$$E(t) = \int_0^t P_{mot}(\tau) d\tau$$

We propose a severe sizing example for a regular heave of height H=7.62 m (+/−3.81 m) and for a wave period T=10 s. The results are given by way of comparison and it can be noted that, under less severe conditions, the sizing could be significantly reduced (absolute).

The results are obtained by means of the above formulas in terms of electric motor power and energy stored in the supercapacitor. The survey was carried out for several accumulator volumes. We first present the example of an accumulator volume $V_1$ of 6 m³, then the complete results in a summary table (Table 1).

Figure 7:
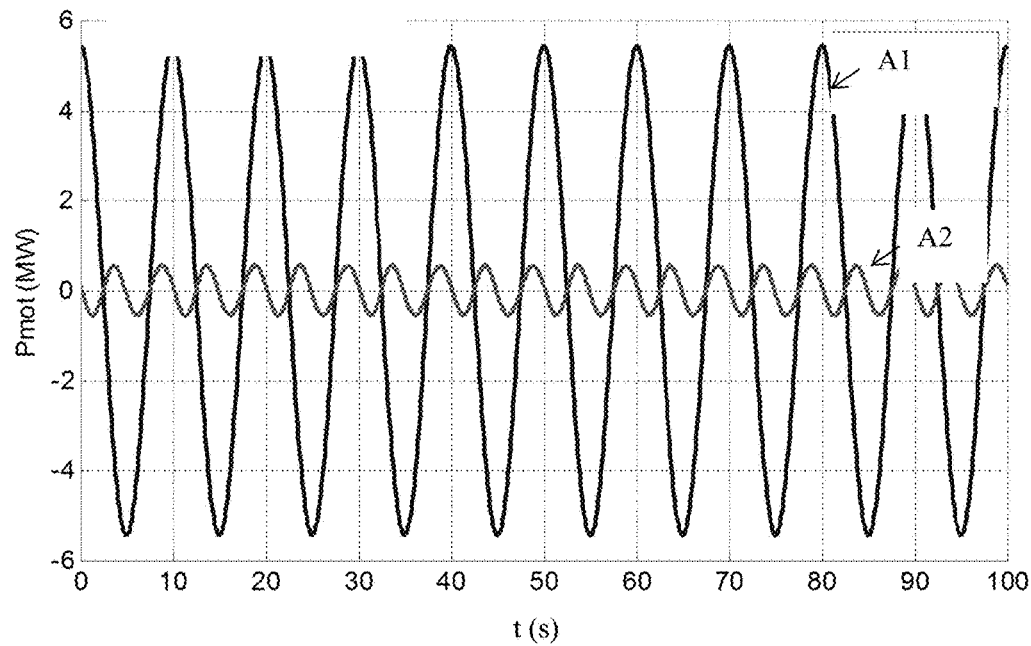
FIG. 7 is a comparative curve of the power of the electric motor for two heave compensator designs.
Figure 8:
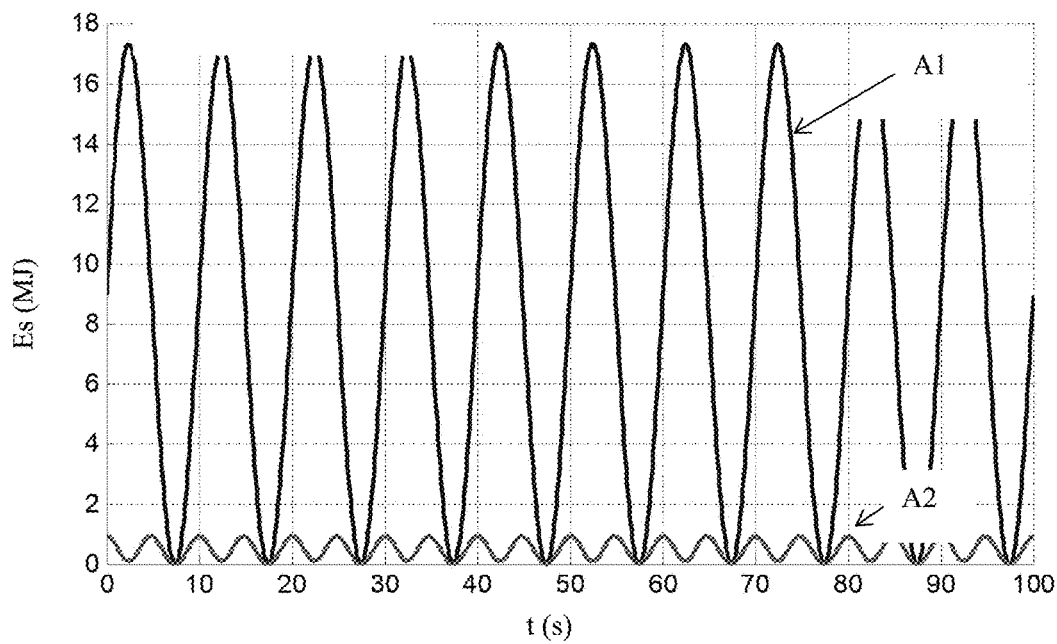
FIG. 8 is a comparative curve of the energy stored for the electric drive system for two heave compensator designs.

FIGS. 7 and 8 illustrate curves respectively relative to the electric motor power Pmot in MW and to the stored energy Es in MJ, for two embodiments of the heave compensator: a first one, A1 (not in accordance with the invention), for which only an electric drive system is used and a second one, A2 (in accordance with the invention), for which an electric drive system and an oleopneumatic damping system are jointly used.

In the hybrid architecture A2 according to the invention, the electric motor is present "only" to compensate for the errors on the main cylinders, whereas in the electric architecture A1, the motor is used to take up the entire suspended weight, it is therefore easy to understand why the power required for the electric motor is much lower in hybrid architecture A2, as shown in FIG. 4. In this case, the power of the electric motor is divided by a factor 9.9 in relation to architecture A1.

In electric architecture A1, the torque remains constant and the rotating speed of the motor changes sign with the ascending or descending wave motion, which is the reason why it can be seen in FIG. 5 that the power changes sign at the same period as the heave (T=10 s). In hybrid architecture A2 according to the invention, the rotating speed of the motor also changes sign with the ascending or descending wave motion. Furthermore, the motor torque changes sign depending on the sign of the error an the force of the main cylinders (which changes approximately at mid-stroke). As a result, the power of the motor changes sign twice per heave period. Thus, the stored energy is useful "only" for half a heave period and it is therefore significantly reduced. In this case, the stored energy is divided by a factor 18.8 in relation to architecture A1. It is thus possible to reduce the dimensions of the electrical energy storage means.

These various factors (P ratio; motor power reduction factor in relation to architecture A1 and E ratio; stored energy reduction, factor in relation to architecture A1) are presented in Table 1, as well as the results for other accumulator volumes V1. Table 1 also shows the power of the electric motor Pmot, the stored energy Es and the maximum pressure $P_{max}$ the accumulator.

TABLE 1

| | Comparative example | | | | |
|---|---|---|---|---|---|
| V1 (m³) | Pmot (MW) | Es (MJ) | P ratio | E ratio | $P_{max}$ (bar) |
| 0 (A1) | 5.43 | 17.3 | 1 | 1 | NA |
| 1 (according to the invention) | 2.06 | 3.84 | 2.6 | 4.5 | 360 |
| 3 (according to the invention) | 0.99 | 1.67 | 5.5 | 10.4 | 245 |
| 6 (A2) | 0.55 | 0.92 | 9.9 | 18.8 | 210 |

It can be noted that the heave compensator according to the invention can be built with a reduced accumulator volume (1, 3 or 6 m³ for example) in relation to the heave compensator according to the prior art.

By way of comparison, in the "conventional" architecture, the accumulator volumes are very large and so are the errors on the force. The architecture described in document FR-2,575,452 (U.S. Pat. No. 5,520,369) allows to slightly reduce the error on the force, although if remains significant, as well as the accumulator volume (16 m³). Besides, an entirely electric-architecture requires custom-built motors and cylinders (~5 MW) and huge supercapacitors, which results in exploding costs.

The hybrid architecture according to the invention allows to cancel the error on the force on bit while significantly reducing the volumes of the bottles (6 m³ for example), the dimensions of the electric motor (x1/10) and of the supercapacitor (x1/19). It requires smaller components and exponentially lower costs. Besides, it can be noted that these components then become "standard" and available on the market, which is an important factor for bringing costs down.

The invention claimed is:

1. A motion compensation system for a load hanging from a mobile unit, comprising a first block and a second block designed for hanging the load, the first block being connected to the mobile unit by a damping system configured to damp a motion of the mobile unit, the motion compensation system comprising a cable running over the first and second blocks, and the damping system comprising at least one oleopneumatic damping system and at least one electric drive system, the at least one electric drive system comprising at least one electric motor that drives in translation a mobile rod by means of a reversible linear actuator.

2. A system as claimed in claim 1, wherein the oleopneumatic damping system comprises at least one hydraulic cylinder and at least one accumulator in oleopneumatic connection with the hydraulic cylinder.

3. A system as claimed in claim 1, wherein the oleopneumatic damping system has a first end connected to the mobile unit and a second end connected to the first block.

4. A system as claimed in claim 3, wherein the electric drive system is arranged in series with the oleopneumatic damping system.

5. A system as claimed in claim 4, wherein the electric drive system drives a rod of the oleopneumatic damping system.

6. A system as claimed in claim 3, wherein the electric drive system is arranged in parallel with the oleopneumatic damping system.

7. A system as claimed in claim 6, wherein the electric drive system has a first end connected to the mobile unit and a second end connected to the first block.

8. A system as claimed in claim 3, wherein the electric drive system is arranged in such a way that at least at one point of the stroke of the oleopneumatic damping system, the electric drive system exerts an action in a substantially orthogonal direction to the direction of displacement of the first block.

9. A system as claimed in claim 8, wherein at least two electric drive systems are arranged symmetrically relative to the axis of the oleopneumatic damping system, so that the components of their actions orthogonal to the direction of first block cancel each other out for any position of first block.

10. A system as claimed in claim 8, wherein one end of the electric drive system is connected to the first block through the agency of an articulated system.

11. A system as claimed in claim 8, wherein one end of the electric drive system is directly connected to the sheave of the articulated arm.

12. A system as claimed in claim 8, wherein one end of the electric drive system is connected to the sheave of the articulated arm by means of an articulated system.

13. A system as claimed in claim 1, wherein the electric drive system comprises an electrical energy storage system connected to the electric motor.

14. A system as claimed in claim 1, wherein the first block is connected to the mobile unit by at least two articulated arms, each articulated arm comprising at least one sheave, the heave compensation system comprising a cable running over the sheaves of the articulated arms and over the first and second blocks.

15. A system as claimed in claim 1, wherein the damping system comprise two oleopneumatic damping systems and two electric drive systems.

16. Use of a motion compensation system as claimed in claim 1 for heave compensation for offshore drill bit support and/or load laying.

17. A method for heave compensation for an offshore drill bit support or pipe laying tool support, comprising using the motion compensation system as claimed in claim 1.

* * * * *